UNITED STATES PATENT OFFICE.

JOHN W. IVERY, OF DILLSBURG, PENNSYLVANIA.

PLASTIC COMPOSITION.

No. 800,110.  Specification of Letters Patent.  Patented Sept. 19, 1905.

Application filed April 17, 1905. Serial No. 256,039.

*To all whom it may concern:*

Be it known that I, JOHN W. IVERY, a citizen of the United States, residing at Dillsburg, in the county of York and State of Pennsylvania, have invented certain new and useful Improvements in Plastic Compositions; and I do declare the following to be a full, clear, and exact description of the invention, such as will enable others skilled in the art to which it appertains to make and use the same.

This invention relates to plastic composition for the manufacture of fire-bricks, building-bricks, terra-cotta, sanitary ware, sewer-pipes, conduits, pottery, and chinaware or any article made of granulated rock, clay, sand, or other substance requiring the process of burning, annealing, or glazing; and the principal object of the invention is to provide a binder for the body materials of fire-brick and pottery which will render the article particularly hard and dry by baking or annealing for a short time.

For making high-grade silicate fire-bricks the following materials and proportions may be used to produce good result: granulated rock, two hundred pounds; molasses or liquid saccharine substance, one pound; water, fifteen pounds. These materials are thoroughly mixed in a mass and are pressed or molded into shape by any suitable apparatus or machine and upon coming from the press or mold are ready for drying previous to firing. The molasses or saccharine matter in these bricks forms a strong and efficient binder for the granular rock and it requires but a short time to thoroughly dry the brick ready for burning.

For building-bricks, terra-cotta, sanitary ware, sewer-pipes, conduits, &c., the following materials and approximate proportions may be used to advantage: clay, forty-five pounds; granular rock or sand, fifteen pounds; grog or ground burnt brick, five pounds; molasses or saccharine substance, six ounces; water, approximately, five pounds. This composition when molded becomes very hard before burning and will not readily crack or disintegrate.

For chinaware or pottery the addition of saccharine matter or molasses as a binder for the body material gives great strength, obviates the liability to cracking or chipping of the material, and produces a strong, durable, and efficient article. The saccharine matter or molasses may be varied in quantity to suit the different materials used and the conditions under which the articles are made.

It will be understood from the foregoing that my invention applies particularly to the class of molded articles which require baking, firing, or annealing, and that a saccharine binder of the character referred to herein could not be used to advantage in articles in which the firing process is omitted.

Having thus described my invention, what I claim as new, and desire to secure by Letters Patent, is—

1. A plastic composition for producing molded and baked or annealed articles, consisting of approximately two hundred pounds of granulated rock, one pound of molasses, and fifteen pounds of water, substantially as described.

2. The herein-described plastic composition, consisting of clay, granular rock or sand, grog or ground burnt brick, molasses and water, in substantially the proportions set forth.

In testimony whereof I have hereunto set my hand in presence of two subscribing witnesses.

JOHN W. IVERY.

Witnesses:
 E. P. BRUNGEN,
 JOS. W. THOMPSON.